(12) United States Patent
Gessel

(10) Patent No.: US 11,452,581 B2
(45) Date of Patent: Sep. 27, 2022

(54) EXTENDED BUCCAL TUBE

(71) Applicant: Thomas F. Gessel, PLLC, Tacoma, WA (US)

(72) Inventor: Thomas Gessel, Tacoma, WA (US)

(73) Assignee: Thomas F. Gessel, PLLC, Tacoma, WA (US)

( * ) Notice: Subject to any disclaimer, the term of this patent is extended or adjusted under 35 U.S.C. 154(b) by 298 days.

(21) Appl. No.: 16/560,385

(22) Filed: Sep. 4, 2019

(65) Prior Publication Data

US 2020/0069396 A1 Mar. 5, 2020

Related U.S. Application Data

(60) Provisional application No. 62/726,765, filed on Sep. 4, 2018.

(51) Int. Cl.
*A61C 7/28* (2006.01)
*A61C 7/34* (2006.01)
*A61C 7/14* (2006.01)

(52) U.S. Cl.
CPC .............. *A61C 7/282* (2013.01); *A61C 7/143* (2013.01); *A61C 7/34* (2013.01)

(58) Field of Classification Search
CPC ........... A61C 7/282; A61C 7/14; A61C 7/141; A61C 7/20; A61C 7/22
See application file for complete search history.

(56) References Cited

U.S. PATENT DOCUMENTS

| | | | | |
|---|---|---|---|---|
| 3,055,110 A | * | 9/1962 | Kesling | A61C 7/282 433/17 |
| 3,593,421 A | * | 7/1971 | Brader | A61C 7/20 433/21 |
| 3,988,832 A | * | 11/1976 | Wallshein | A61C 7/20 433/21 |
| 5,092,941 A | * | 3/1992 | Miura | A61C 7/00 148/563 |
| 6,655,959 B2 | * | 12/2003 | Farzin-Nia | A61C 7/20 433/18 |
| 10,478,270 B2 | * | 11/2019 | Yousefian | A61C 7/282 |
| 2003/0039939 A1 | * | 2/2003 | Farzin-Nia | A61C 7/20 433/18 |
| 2004/0081937 A1 | * | 4/2004 | Graham | A61C 7/36 433/19 |
| 2012/0315595 A1 | * | 12/2012 | Beaudoin | A61C 7/22 433/9 |

(Continued)

*Primary Examiner* — Ralph A Lewis
(74) *Attorney, Agent, or Firm* — Loyal IP Law, PLLC; Travis Banta

(57) ABSTRACT

This disclosure generally describes an extended buccal tube which is used in connection with braces for the teeth. The extended buccal tube accommodates an arch wire of a sufficient length to allow space to be created between one or more teeth while retaining the arch wire within a tube of the extended buccal tube. As space is created and the arch wire slides through the extended buccal tube, an overall length of the arch wire may be monitored through one or more windows in the extended buccal tube. Tooth pads on extended buccal tube may be rotatable by up to 20° in two axes for fitment purposes. When space has been created between the one or more teeth, extended buccal tube may be cut along scoring lines to separate teeth that were bonded together by the extended buccal tube.

17 Claims, 11 Drawing Sheets

(56) References Cited

U.S. PATENT DOCUMENTS

| | | | |
|---|---|---|---|
| 2016/0120624 A1* | 5/2016 | Yousefian | A61C 7/282 433/17 |
| 2017/0252127 A1* | 9/2017 | Yousefian | A61C 7/10 |
| 2019/0262102 A1* | 8/2019 | Haralambidis | A61C 7/28 |
| 2020/0069396 A1* | 3/2020 | Gessel | A61C 7/282 |

\* cited by examiner

EXTENDED BUCCAL TUBE

CROSS-REFERENCE TO RELATED APPLICATIONS

This application claims the benefit of U.S. Provisional Application No. 62/726,765, filed Sep. 4, 2018, which is incorporated herein by reference in its entirety, including but not limited to those portions that specifically appear hereinafter, the incorporation by reference being made with the following exception: In the event that any portion of the above-referenced provisional application is inconsistent with this application, this application supercedes said above-referenced provisional application.

BACKGROUND

1. Technical Field

This disclosure relates generally to a device used in connection with braces for the teeth to accommodate an arch wire of increased length over prior art solutions. In one embodiment, a buccal tube may include two or more pads for bonding the buccal tube to two or more teeth. In another embodiment, the buccal tube may include ports for viewing a length of an arch wire within the buccal tube. In another embodiment, the buccal tube may include scoring or perforations such that the buccal tube may be separated into two separate pads, alleviating the need to replace the pads when the buccal tube has served its purpose.

2. Description of the Related Art

While dentistry has been ubiquitous throughout the history of mankind, orthodontics is a relatively modern field. As the technology of dentistry developed, so too did the ability of specialized orthodontic experts to facilitate the movement of teeth inside a person's mouth to correct the physiology of the person's bite, the positioning of specific teeth within the person's bite, and the overall cosmetic appearance of a person's teeth in terms of straightness and alignment. Orthodontic braces were developed as a system to align a person's teeth in a more or less ideal arrangement for a variety of purposes. For example, some people experience extreme pain when eating because of the alignment of their teeth. Other people may be self-conscious about the alignment of their teeth and experience relief when steps are taken to ensure a person has a more or less ideal smile. In other cases, the alignment of a person's teeth may prevent the use of all of the person's teeth, leading some teeth to experience premature wear.

A host of problems are associated with the alignment and relative straightness of teeth to other teeth in a person's jaw. Orthodontists have developed braces, which are essentially a series of pads bonded to each tooth in a person's mouth, and which are linked together by a wire, known as an arch wire. The arch wire is connected to each individual pad with the use of orthodontic rubber bands which are placed around two or four prongs on the pads and which contain and secure the arch wire to the pads. The orthodontic rubber bands further retain the arch wire within each pad.

The arch wire interconnects each tooth in a person's upper jaw or lower jaw, for example, and provides slow even pressure which slowly moves the placement of a person's teeth within the person's jaw. The process of moving teeth within a person's jaw may take several years depending on the distance teeth must be moved or the specific problem being addressed and the process can be quite painful. Orthodontists must also carefully monitor the progress of the movement of the teeth in braces to ensure that the teeth are moving in an intended direction. Thus, frequent visits to the orthodontist by people who have braces are necessary for the orthodontist to make necessary adjustments to the braces or further modifications, as necessary, to ensure the movement of the teeth caused by the braces is consistent with a desired outcome.

One orthodontic problem is known as an impacted tooth, also referred to as a "stuck tooth" or "stuck teeth," which, herein, may be used interchangeably. A stuck tooth is one tooth for which adequate space to accommodate the tooth in the jaw does not exist. For example, one tooth may be "crowded out" and pushed behind or in front of other teeth in the jaw. Stuck teeth refers to the condition where at least one tooth lacks adequate space for proper alignment within a person's jaw. FIG. 1 illustrates a conventional orthodontic solution for a stuck tooth and other orthodontic problems where a length of an arch wire must be extended to provide additional space in a person's jaw.

FIG. 1 illustrates a conventional use for a conventional buccal tube for braces 100. Braces 100 are placed on a plurality of teeth, identified in FIG. 1 as teeth 105a-105f. As can be seen in FIG. 1, tooth 105e is stuck behind tooth 105d and tooth 105f. Braces 100 are installed in the following conventional manner to realign tooth 105e with teeth 105a-105d and 105f. A buccal tube 110 may be installed on a rearmost tooth in a person's jaw. Buccal tube 110 includes a pad for a single tooth and provides a tube through which arch wire 130 may be installed, as will be described below. Buccal tube 110 may include a hook 110a which allows connection of buccal tube 110 to other elements of braces 100, such as a lower jaw (not shown), for example. Braces 100 may further include pads 115a-115d. Pad 115a may be installed on tooth 105b while pad 115b may be installed on tooth 105c. Pad 115c may be installed on tooth 105d and pad 115d may be installed on tooth 105f. Buccal tube 110 and pads 115a-115d may be affixed to teeth 105a-105d by an adhesive, glue, cement (including cements that harden when exposed to ultraviolet light), or other techniques known in the art.

As shown in FIG. 1, pads 115a-115d include two prongs. Pad 115a includes a bottom prong 120a and a top prong 120b which retain an elastic band 125a which, in turn, provides a connection between pad 115a and arch wire 130. Similarly pad 115b includes a bottom prong 120c and a top prong 120d which retain an elastic band 125b which, in turn provides a connection between pad 115b and arch wire 130. Pad 115c includes a bottom prong 120e and a top prong 120f which retain an elastic band 125c which, in turn, provides a connection between pad 115c and arch wire 130. Pad 115d includes a bottom prong 120g and a top prong 120h which retain an elastic band 125d which, in turn, provides a connection between pad 115d and arch wire 130. Since each of pads 115a-115d are affixed to one of teeth 105b-105d and 105f, teeth 105b-105d and 105f may each be indirectly connected to arch wire 130. Accordingly, as arch wire exerts pressure from tension in arch wire 130, teeth 105b-105d and 105f are gently moved within a person's jaw.

Arch wire 130 may include a cinch 135 at an end of arch wire 130. In some cases, cinch 135 may be a bend in arch wire 130 at an angle to ensure that arch wire 130 is not pulled through buccal tube 110. Buccal tube 110 may provide a tube of appropriate dimension to allow arch wire 130 to pass through buccal tube 110. Accordingly, arch wire 130 is secured to tooth 105a via the tube provided in buccal tube 110. Thus, cinch 135 is a retainer, of sorts, to prevent arch wire 130 from pulling through buccal tube 110 as tooth 105e becomes unstuck, as will be further discussed below.

As shown in FIG. 1, arch wire 130 has been fitted with a spring 140 between pads 115c and 115d. Spring 140 may be compressed such that spring tension is applied to tooth 105d and tooth 105f, pushing tooth 105d and tooth 105f apart, laterally, to provide adequate space between tooth 105d and tooth 105f for tooth 105e. Since arch wire 130 is connected to each tooth 105b-105d and 105f and to tooth 105a by buccal tube 110, each of teeth 105a-105d and 105f may be moved relative to each other to open space between tooth 105d and tooth 105f for tooth 105e. For example, teeth 105a-105d may move towards a back portion of a person's jaw to provide space for tooth 105e. However, as teeth 105a-105f are moved by pressure provided by spring 140 along arch wire 130, a length of arch wire 130 changes. For example, as teeth 105a-105d move to create additional space for tooth 105e, arch wire 130 may pull through buccal tube 110 up to cinch 135, extending arch wire 130 from a first length at installation (between buccal tube 110 and tooth 105f) to a second longer length (between buccal tube 110 and tooth 105f) as teeth 105a-105f move.

There are several problems with this conventional solution to create space for tooth 105e. First, extending arch wire 130 to a point where it is long enough to provide space for tooth 105e before cinch 135 is drawn into buccal tube 110 may result in arch wire 130 poking a person in the mouth and causing injury. For example, cinch 135, because of excessive length, may poke a person's cheek or gums in a manner that may cause injury to the person. Second, if arch wire 130 is left too short to avoid causing injuries with a person's mouth, as teeth 105a-105e move, arch wire 130 will be prematurely drawn through buccal tube 110 necessitating an orthodontist to replace arch wire 130 with a slightly longer arch wire. This process may be repeated several times which may be an inefficient use of the orthodontist's time. Third, a vast majority of emergency patient visits for an orthodontist are directly related to braces 100, and especially arch wire 130, causing injury to a patient's mouth. Too much length or too little length for arch wire 130 causes an orthodontist to spend a significant portion of a work day to either remanufacture a new arch wire or have a patient complaining of arch wire injuries to correct for a length of arch wire 130 at each stage in the process of moving teeth 105a-105e and 105f to accommodate tooth 105e. Significant efficiency could be gained by improvements in conventional technology if a length of arch wire 130 could be less sensitive in terms of overall length.

Accordingly, it is one object of this disclosure to provide an extended buccal tube. It is another object of this disclosure to provide a buccal tube having more than one pad to attach to more than one tooth and provide an extended tube for accommodating an arch wire. It is another object of this disclosure to provide one or more windows or ports within the extended buccal tube to allow an orthodontist to monitor an overall length of an arch wire. It is another object of this disclosure to provide an extended buccal tube which may be scored or perforated for eventual separation between two pads on two different teeth.

SUMMARY

Disclosed herein is an extended buccal tube which allows an end of an arch wire to be fully contained within the buccal tube throughout its use in moving teeth to accommodate a stuck tooth. The extended buccal tube may include one or more windows or ports which allow an orthodontist to monitor an overall length of the arch wire in the extended buccal tube. The extended buccal tube may also attach to one or more teeth by one or more pads and have a tube disposed there between. The extended buccal tube may also be perforated or scored to allow the two or more pads to be eventually separated after adequate space between teeth has been created.

BRIEF DESCRIPTION OF THE DRAWINGS

The accompanying drawings illustrate various embodiments of an extended buccal tube.

DETAILED DESCRIPTION OF PREFERRED EMBODIMENTS

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
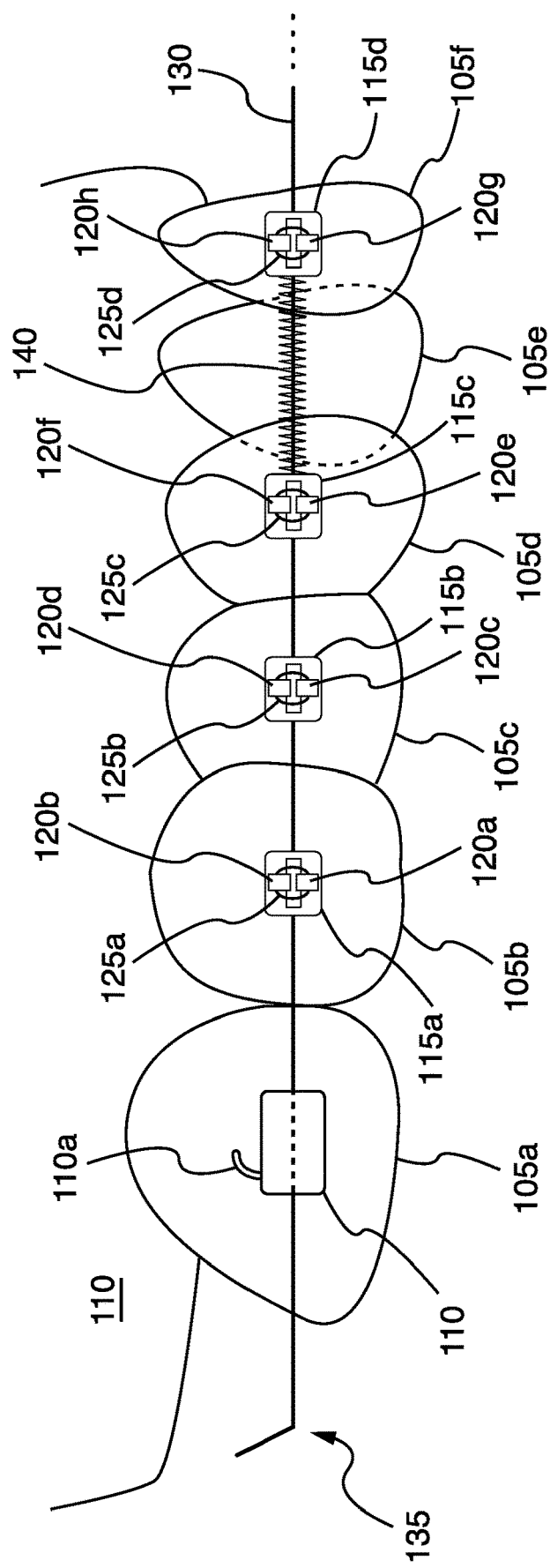
FIG. 1 illustrates a prior art system of braces including a buccal tube.
Figure 2A:
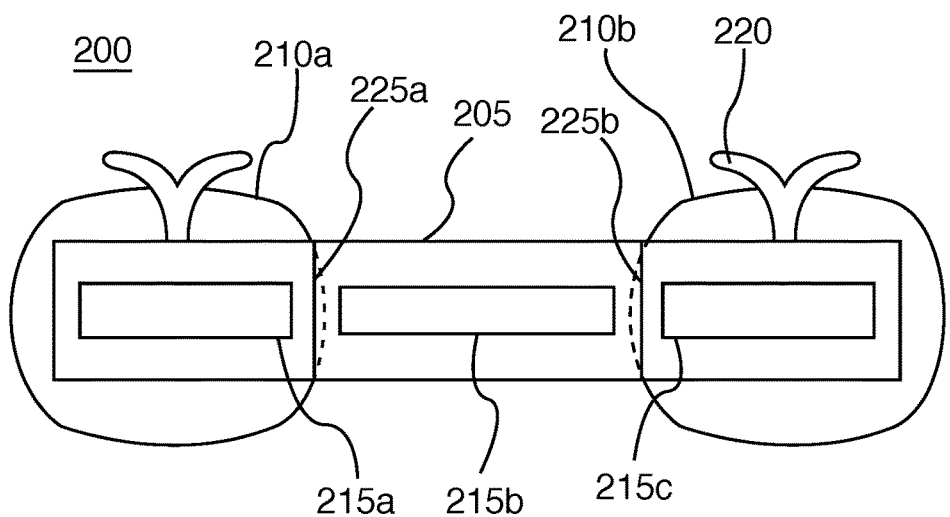
FIG. 2A illustrates a side view of an extended buccal tube.

FIG. 2A illustrates a side view of an extended buccal tube 200. Extended buccal tube 200 includes a body 205 which is connected to a first pad 210a and a second pad 210b which may be installed on an inside surface of body 205 and used to affix extended buccal tube 200 to teeth. Body 205 may further include a plurality of windows or viewing ports 215a, 215b, and 215c cut into body 205. Windows 215a-215c allow an orthodontist to view an arch wire which may be disposed inside body 205, as will be discussed below. Windows 215a-215c may be installed along an outside surface of body 205, such as a surface of extended buccal tube 200 which is a surface opposite of pad 210a and pad 210b. Alternatively, windows 215a-215c may be provided along a bottom surface of body 205 (opposite of hooks 220) in addition to or in lieu of windows installed along an outside surface of body 205.

Further, while body 205 is shown as including three windows 215a-215c, any number of windows may be implemented in extended buccal tube 200. In one embodiment, body 205 may include a single window. In another embodiment, body 205 may include two windows. In another embodiment, body 205 may include a plurality of windows. The number of windows implemented in body 205 may be determined by an orthodontist's preferences or by a cost/benefit analysis of incorporating a specific number of windows into body 205 during a manufacturing process. Alternatively, the number of windows implemented in body 205 may be determined by mechanical stresses on body 205 in order to balance maximum view area inside body 205 against minimum required structural strength for body 205.

As used herein, "extended length" buccal tube 200 may be a buccal tube that is as long as a distance between midpoints of two consecutive teeth within a person's jaw (such as a second molar and a first molar, for example). In another example, an "extended length" buccal tube 200 may be a buccal tube that is as long as a horizontal length of two consecutive teeth along a person's jaw (e.g., a distance along an outer surface of a second molar and a first molar where braces are normally installed). In another example, an "extended length" buccal tube 200 may be a buccal tube that is longer than a width of a tooth along an outer surface of a person's jaw which may be about 8 millimeters. In more precise terms, an extended length buccal tube 200 may be a buccal tube that is between 8 and 25 millimeters across a length of body 205.

Body 205 may further include a hooks 220 for accommodating attachments, by rubber bands, to other orthodontic devices installed with extended buccal tube 200. Hooks 220 may be attached to a top surface of body 205 of extended buccal tube 200 and may rise from the top surface of body 205 in an arcuate manner, or in a curve, at a necessary length to facilitate attachment of a rubber band to hooks 220. Hooks 220 may be implemented as a single hook or may be implemented as a double hook, as shown in FIG. 2A. Hooks 220 may also be implemented as a single hook or, as shown in FIG. 2A, as two double hooks. A single hook may have an arcuate portion extending in a first direction while a double hook may include a second arcuate portion extending in another second direction, usually opposite of the first direction. For example, a double hook may be implemented in a "Y" shape having two hooks arc away from a central stem. Hooks 220s may be used for any orthodontic purpose to attach a rubber band from hooks 220s to another location, as determined necessary by an orthodontist. For example, in order to adjust a person's bite, rubber bands may be attached between hooks 220 and another orthodontic device on a person's lower jaw. In some embodiments, hooks 220 may be optionally installed, may be removed by cutting, or may not be included.

Body 205 may further include a first scoring 225a and a second scoring 225b that extends circumferentially around an axis defined by a width of body 205, as shown in FIGS. 2A-2D. First scoring 225a and second scoring 225b may be perforations or points where extended buccal tube 200 has been scored to accommodate cutting of body 205 by various cutting devices, such as wire cutters. For example, when adequate space has been created for a stuck tooth, body 205 may be cut at first scoring 225a and second scoring 225b to remove a connection between a first tooth and a second tooth, leaving an arch wire as the only remaining connection between the first tooth and a second tooth.

Figure 2B:
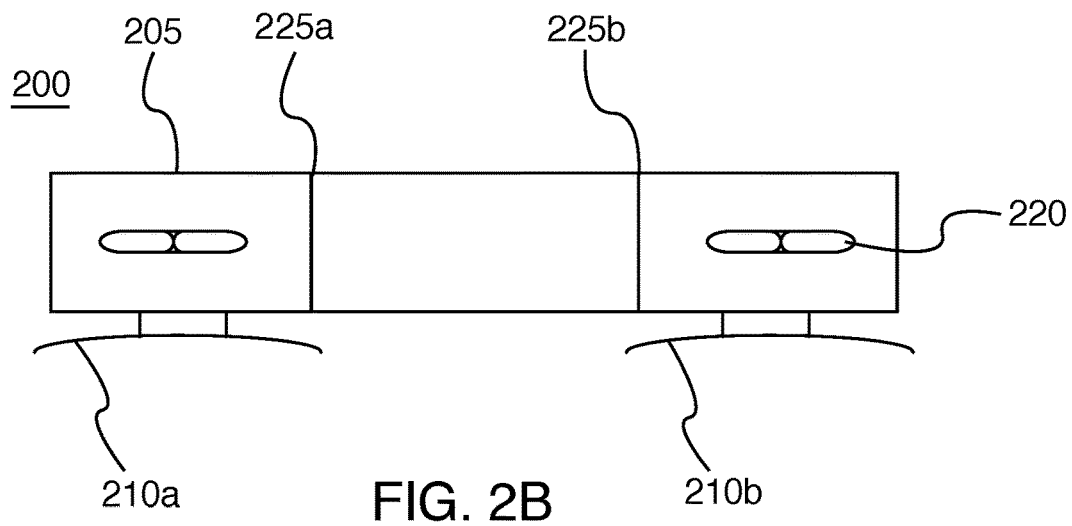
FIG. 2B illustrates a top view of an extended buccal tube.

FIG. 2B illustrates a top view of extended buccal tube 200. As shown in FIG. 2B, extended buccal tube 200 includes body 205 and a first tooth pad 210a and a second tooth pad 210b. Body 205 includes scoring across the top surface of body 205, as shown in FIG. 2B, implemented as first scoring 225a and second scoring 225b, as described above. Hooks 220, as described above, may further be installed on body 205 of extended buccal tube 200.

Figure 2C:
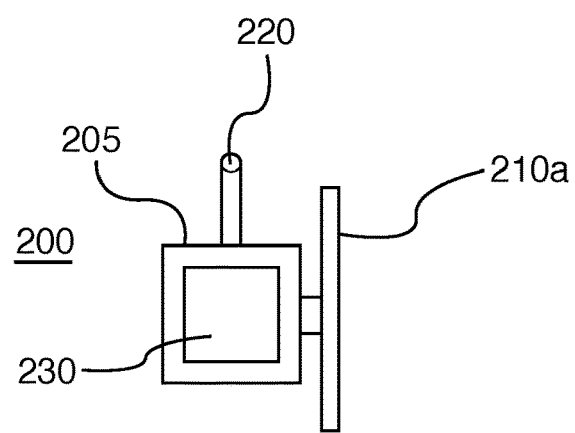
FIG. 2C illustrates an axial view of an extended buccal tube.

FIG. 2C illustrates an axial view of extended buccal tube 200. As shown in FIG. 2C, the axial view of extended buccal tube 200 is a perspective looking down tube 230 from the rear of extended buccal tube 200. Extended buccal tube 200 includes a body 205, a first tooth pad 210a, and hooks 220. Second tooth pad 210b is not shown in FIG. 2C due to the axial perspective of the view shown in FIG. 2C. Body 205 may provide a tube 230 which is hollow and may accommodate an arch wire. Tube 230 may be cylindrical, square, or any other shape to accommodate an arch wire being installed within tube 230. Tube 230 may extend along a length of body 205 such that tube 230 provides an uninterrupted recess from a first end of body 205 to a second end of body 205.

Figure 2D:
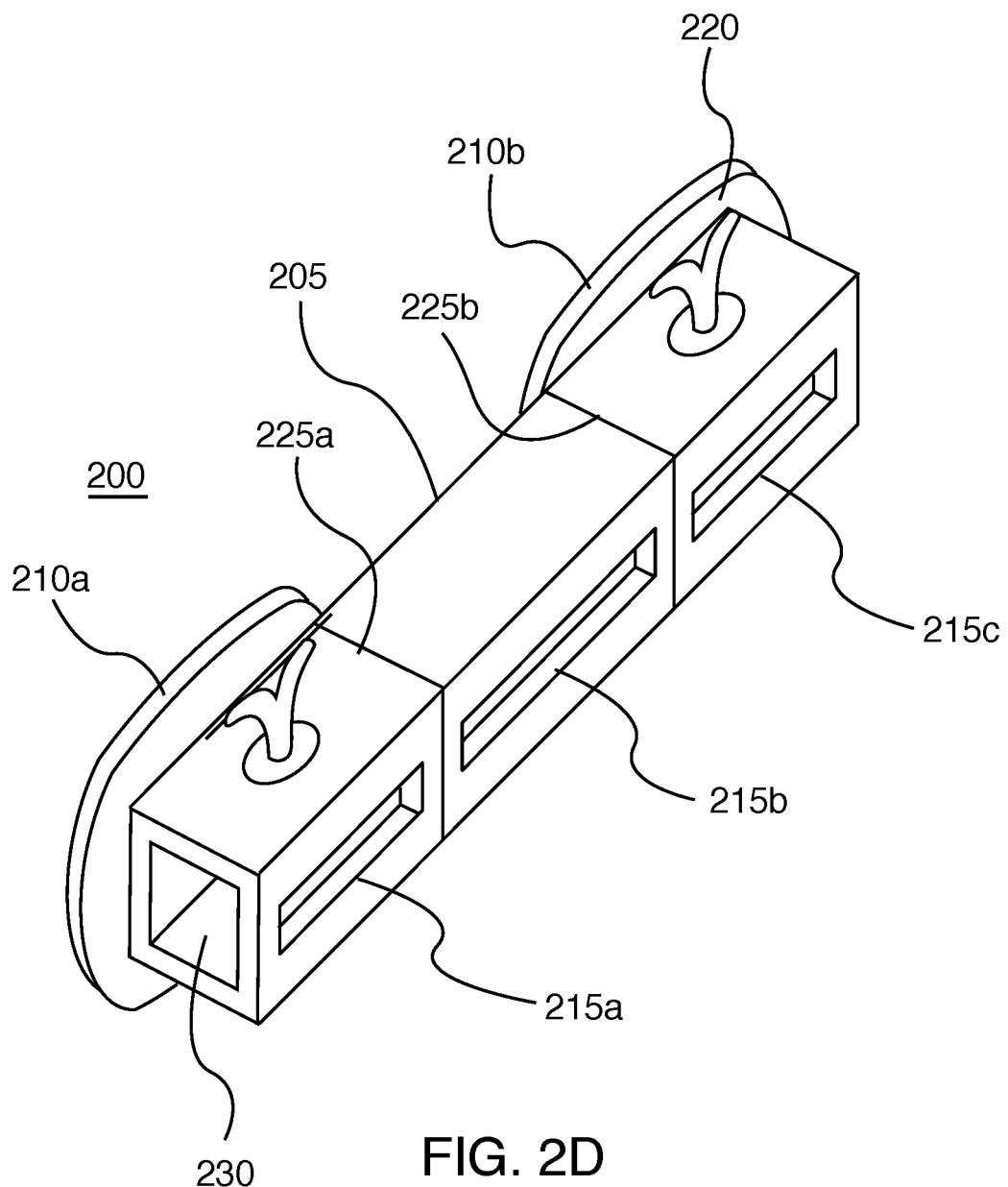
FIG. 2D illustrates a perspective view of an extended buccal tube.

FIG. 2D illustrates a perspective view of an extended buccal tube 200. As shown in FIG. 2D, the perspective view of extended buccal tube 200 is a perspective looking at extended buccal tube 200 from a top/front perspective. Extended buccal tube 200 includes a body 205. A first tooth pad 210a and a second tooth pad 210b is attached to body 205 which allows body 205 to be connected, via first tooth pad 210a and second tooth pad 210b to two teeth. As previously discussed, a plurality of windows 215a-215c, may be installed in a side of body 205 to allow an orthodontist to see inside tube 230. Tube 230 may provide an uninterrupted recess through body 205 such that a continuous recess is formed between a first end and a second end of body 205. A hooks 220 may be disposed on a top surface of body 205, as previously discussed. Body 205 of extended buccal tube 200 may further include first scoring 225a and second scoring 225b, which have been discussed previously.

Figure 3A:
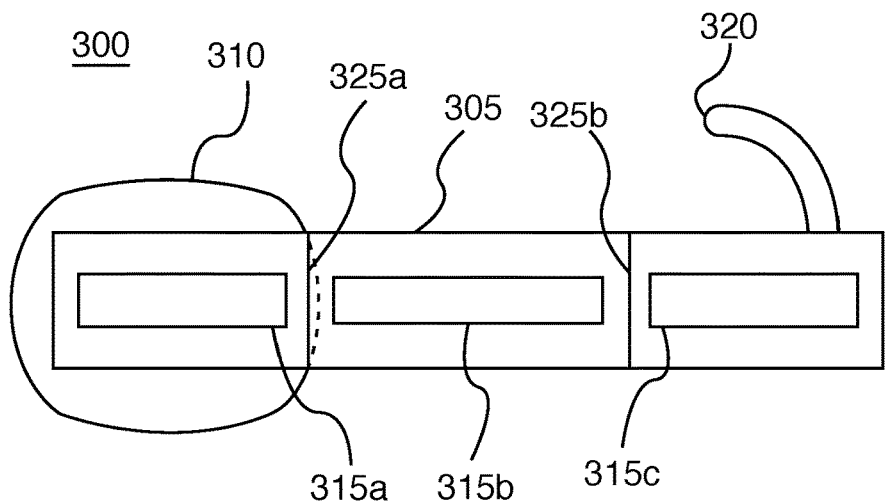
FIG. 3A illustrates a side view of an extended buccal tube having a single pad.

FIG. 3A illustrates a side view of an alternative implementation of extended buccal tube 200 shown in FIG. 2A-2D, as extended buccal tube 300. Extended buccal tube 300 includes a body 305 which is connected to a tooth pad 310 which may be installed on an inside surface of body 305 and used to affix extended buccal tube 300 to teeth. As shown herein, extended buccal tube 300 includes only a single tooth pad 310 such that extended buccal tube 300 attaches only at one tooth but still provides a tube of extended length.

For example, an "extended length" buccal tube 300 may be a buccal tube that is as long as a distance between midpoints of two consecutive teeth within a person's jaw (such as a second molar and a first molar, for example). In another example, an "extended length" buccal tube 300 may be a buccal tube that is as long as a horizontal length of two consecutive teeth along a person's jaw (e.g., a distance along an outer surface of a second molar and a first molar where braces are normally installed). In another example, an "extended length" buccal tube 300 may be a buccal tube that is longer than a width of a tooth along an outer surface of a person's jaw which may be about 8 millimeters. In more precise terms, an extended length buccal tube 300 may be a buccal tube that is between 8 and 25 millimeters across a length of body 305.

Body 305 may further include a plurality of windows or viewing ports 315a, 315b, and 315c cut into body 305. Windows 315a-315c allow an orthodontist to view an arch wire which may be disposed inside body 305, as will be discussed below. Windows 315a-315c may be installed along an outside surface of body 305, such as a surface of extended buccal tube 30 which is a surface opposite of pad 310a and pad 310b. Alternatively, windows 315a-315c may be provided along a bottom surface of body 305 (opposite of hook 320) in addition to or in lieu of windows installed along an outside surface of body 305.

Further, while body 305 is shown as including three windows 315a-315c, any number of windows may be implemented in extended buccal tube 300. In one embodiment, body 305 may include a single window. In another embodiment, body 305 may include two windows. In another embodiment, body 305 may include a plurality of windows. The number of windows implemented in body 305 may be determined by an orthodontist's preferences or by a cost/benefit analysis of incorporating a specific number of windows into body 305 during a manufacturing process. Alternatively, the number of windows implemented in body 305 may be determined by mechanical stresses on body 305 in order to balance maximum view area inside body 305 against minimum required structural strength for body 305.

Body 305 may further include a hook 320 for accommodating attachments, by rubber bands, to other orthodontic devices installed with extended buccal tube 300. Hook 320 may be attached to a top surface of body 305 of extended buccal tube 300 and may rise from the top surface of body 305 in an arcuate manner, or in a curve, at a necessary length to facilitate attachment of a rubber band to hook 320. As before, hook 320 may be implemented as a single hook or a double hook and may be implemented as two single hooks or two double hooks, according to a particular implementation. For example, in order to adjust a person's bite, rubber bands may be attached between hook 320 and another orthodontic device on a person's lower jaw. In some embodiments, hook 320 may be optionally installed, may be removed by cutting, or may not be included.

Body 305 may further include a first scoring 325a and a second scoring 325b that extends circumferentially around an axis defined by a width of body 305, as shown in FIGS. 2A-2D. First scoring 325a and second scoring 325b may be perforations or points where extended buccal tube 300 has been scored to accommodate cutting of body 305 by various cutting devices, such as wire cutters. For example, when adequate space has been created for a stuck tooth, body 305 may be cut at first scoring 325a and second scoring 325b to remove a connection between a first tooth and a second tooth, leaving an arch wire as the only remaining connection between the first tooth and a second tooth.

Figure 3B:
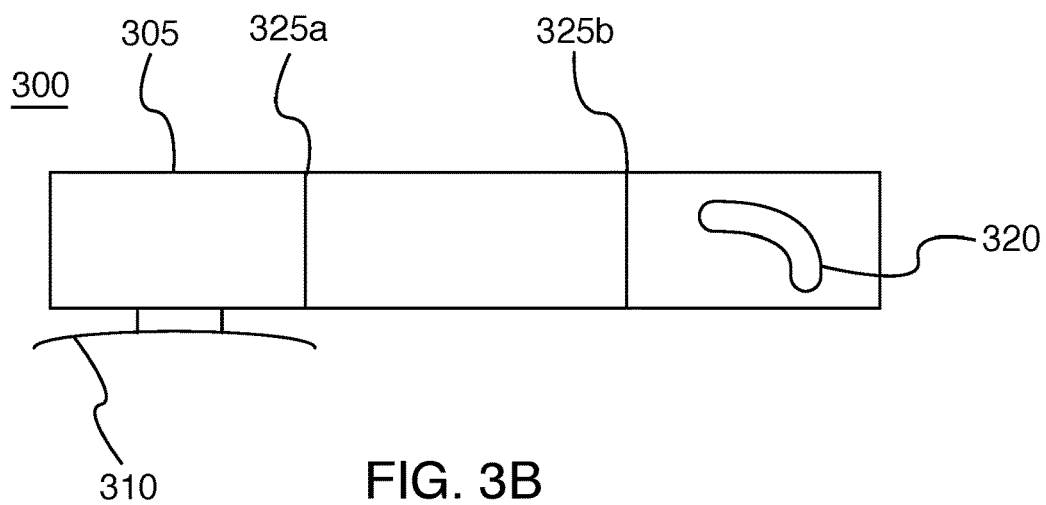
FIG. 3B illustrates a top view of an extended buccal tube having a single pad.

FIG. 3B illustrates a top view of extended buccal tube 300. As shown in FIG. 3B, extended buccal tube 300 includes body 305 and a tooth pad 310. Body 305 includes scoring across the top surface of body 305, as shown in FIG. 3B, implemented as first scoring 325a and second scoring 325b, as described above. Hook 320, as described above, may further be installed on body 305 of extended buccal tube 300.

Figure 3C:
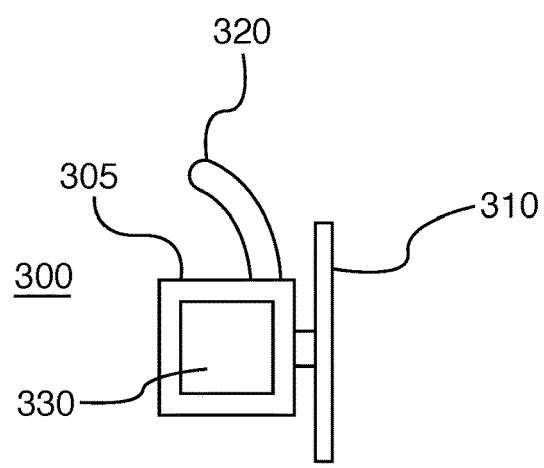
FIG. 3C illustrates an axial view of an extended buccal tube having a single pad.

FIG. 3C illustrates an axial view of extended buccal tube 300. As shown in FIG. 3C, the axial view of extended buccal tube 300 is a perspective looking down tube 330 from the rear of extended buccal tube 300. Extended buccal tube 300 includes a body 305 and a tooth pad 310. Body 305 may provide a tube 330 which may accommodate an arch wire. As previously discussed, tube 330 may be cylindrical, square, or any other shape to accommodate an arch wire being installed within tube 330. Tube 330 may extend along a length of body 305 such that tube 330 provides an uninterrupted recess from a first end of body 305 to a second end of body 305.

Figure 3D:
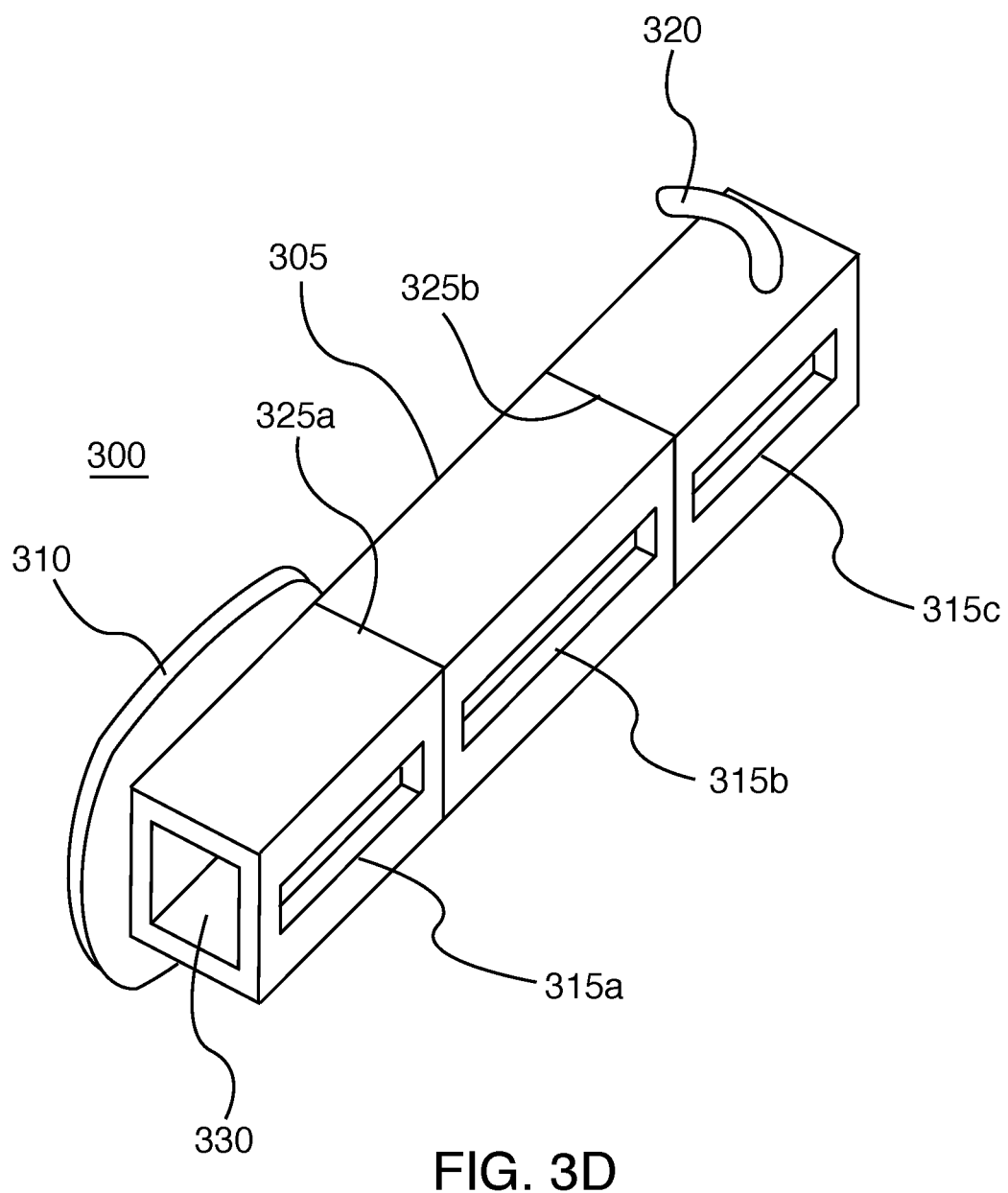
FIG. 3D illustrates a perspective view of an extended buccal tube having a single pad.

FIG. 3D illustrates a perspective view of an extended buccal tube 300. As shown in FIG. 3D, the perspective view of extended buccal tube 300 is a perspective looking at extended buccal tube 300 from a top/front perspective. Extended buccal tube 300 includes a body 305. A tooth pad 310 is attached to body 305 which allows body 305 to be connected, via tooth pad 310 to a tooth. As previously discussed, a plurality of windows 315a-315c, may be installed in a side of body 305 to allow an orthodontist to see inside tube 330. Tube 330 may provide an uninterrupted recess through body 305 such that a continuous recess is formed between a first end and a second end of body 305. A hook 320 may be disposed on a top surface of body 305, as previously discussed. Body 305 of extended buccal tube 300 may further include first scoring 325a and second scoring 325b, which have been discussed previously.

Figure 4:
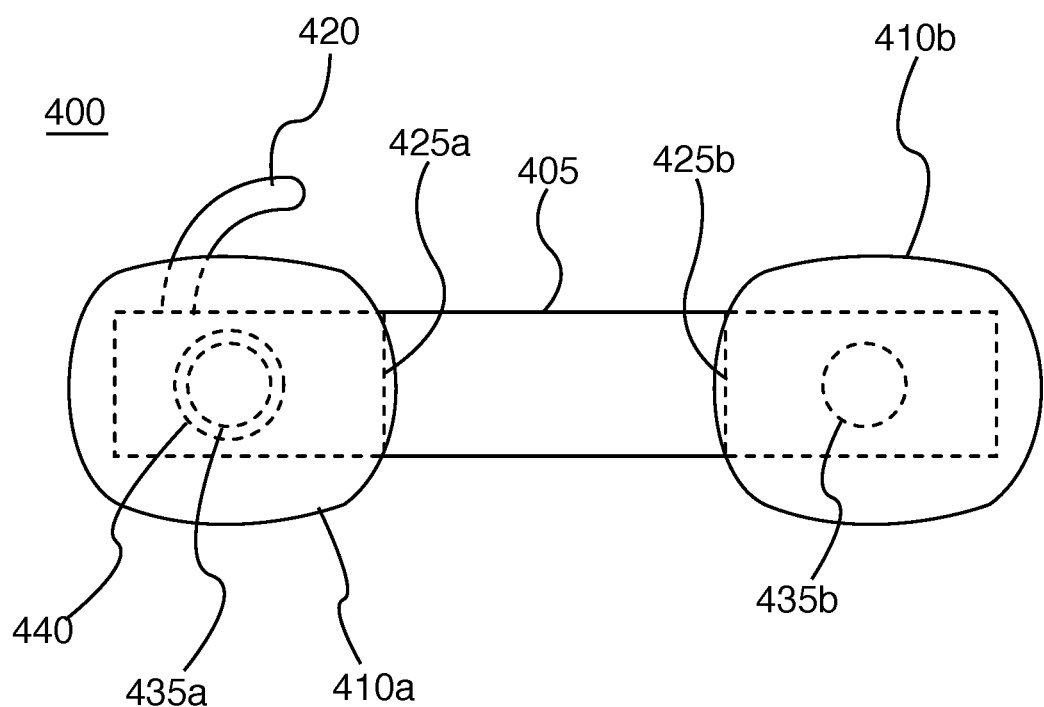
FIG. 4 illustrates a tooth-side view of an extended buccal tube.

FIG. 4 illustrates a tooth-side view of an extended buccal tube 400, which may be similar in implementation and description to extended buccal tube 200, shown in FIGS. 2A-2D and described above. However, FIG. 4 illustrates extended buccal tube 400 if viewed from the perspective of a tooth or teeth to which extended buccal tube 400 may be affixed.

Extended buccal tube 400 includes a body 405 which connects to first tooth pad 410a and to second tooth pad 410b. Body 405 may further include hook 420 which extends from a top surface of body 405 in an arcuate manner. Hook 420 may be a single hook or a double hook and may be implemented as two single hooks or two double hooks, according to a particular implementation, as previously discussed. Body 405 may also include first scoring 425a and second scoring 425b as previously discussed.

As shown in FIG. 4, a connection between body 405 and first tooth pad 410a and second tooth pad 410b may altered to allow either first tooth pad 410a or second tooth pad 410b (or both, depending on implementation) to rotate up to 20° in two axes of movement (both in and out and up and down) to allow extended buccal tube 400 to better align with a specific alignment of a person's teeth. As shown in FIG. 4, first tooth pad 410a may connected to body 405 by connection 435a. Similarly, second tooth pad 410b may be connected to body 405 by connection 435b. Connection 435a and connection 435*b* may be cylindrical studs protruding from body 405 towards first tooth pad 410*a* and second tooth pad 410*b*. As shown in FIG. 4, cylindrical stud 435*a* may act as a ball for a complimentary socket 440 on first tooth pad 410*a*. While second tooth pad 410*b* is not shown as having a ball and socket connection in FIG. 4, such an implementation where both first tooth pad 410*a* and second tooth pad 410*b* both include a ball and socket connection has also been conceived. Other connection mechanisms are possible to allow one or both of tooth pads 410*a* and 410*b* to rotate up to 20° to better fit onto two consecutive teeth in a person's jaw. For example, pad 410*a*, to be properly fitted and affixed to a first tooth may be rotated up by 5° and in by 14° while pad 410*b* may be rotated down by 3° and out 20°.

Figure 5:
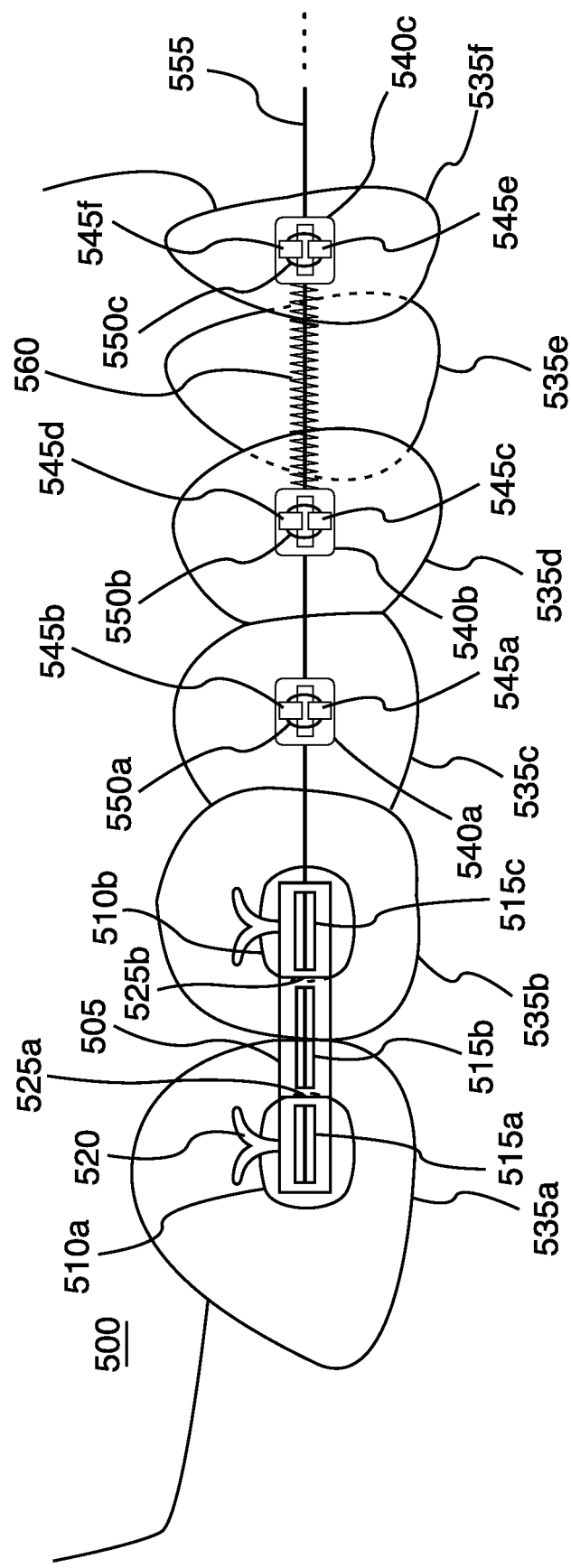
FIG. 5 illustrates an implementation for braces using an extended buccal tube to correct a stuck tooth condition.

FIG. 5 illustrates an implementation for braces 500 using an extended buccal tube 505 to correct a stuck tooth condition. It should be noted that the use of extended buccal tube 505 is not limited to use with a stuck tooth condition. Rather, extended buccal tube 505 may be ideal for any condition that requires a change in an overall length of an arch wire, such as arch wire 555, to correct the condition. Extended buccal tube 505 may be similar in implementation and description to extended buccal tube 200 shown in FIG. 2 and extended buccal tube 300 shown in FIG. 3 or may incorporate one or more features of extended buccal tube 400, shown in FIG. 4.

Extended buccal tube 505 may be affixed by first tooth pad 510*a* to tooth 535*a* and by second tooth pad 505 to tooth 535*b*. Extended buccal tube 505 may further include one or more windows or viewing ports 515*a*-515*c* to allow an orthodontist to visually inspect a length of arch wire 555 within a tube, or continuous recess inside extended buccal tube 505 which allows arch wire 555 to slide through buccal tube 505. Extended buccal tube 505 may further include a hook 520 which may extend outwardly from a top surface of buccal tube 505 in an arcuate or curved manner. Hook 520 may be implemented as a single hook or a double hook and may be implemented as two single hooks or two double hooks, according to a particular implementation, as previously discussed. Hook 520 may serve as a connection point for other orthodontic elements in braces 500 according to an orthodontist's discretion. Extended buccal tube 505 may further include scoring 525*a* and scoring 525*b* which provides weak points in extended buccal tube 505 which allow an orthodontist to easily cut extended buccal tube 505 and separate the connection via extended buccal tube 505 to tooth 535*a* and tooth 535*b*. In such a situation, arch wire 555 may also be cut or may be left in place again, according to an orthodontist's discretion.

As shown in FIG. 5, tooth 535*c* may include a pad 540*a*. Tooth 535*d* may include a pad 540*c* and tooth 535*f* may include a pad 540*e*. Pads 540*a*-540*c* may be affixed to teeth 535*c*, 535*d* and 535*f*. Pad 540*a* may include a bottom prong 545*a* and a top prong 545*b* which accommodate installation of a rubber band 550*a* which connects arch wire 555 to pad 540*a*. Similarly, pad 540*b* may include a bottom prong 545*c* and a top prong 545*d* which accommodate installation of a rubber band 550*b* which connects arch wire 555 to pad 540*b*. Pad 540*c* may include a bottom prong 545*e* and a top prong 545*f* which accommodate installation of a rubber band 550*c* which connects arch wire 555 to pad 540*c*.

As shown in FIG. 5, a spring 560 may be installed between pad 540*b* and pad 540*c*. Spring 560 may be compressed to apply spring tension to pad 540*b* and pad 540*c* which forces tooth 535*d* apart from tooth 535*f*. Tooth 535*d* pushes on tooth 535*c* which in turn pushes on tooth 535*b*, which in turn pushes on tooth 535*a* to create space in the jaw for tooth 535*e*. Tooth 535*f* also pushes against other teeth, which are not shown in FIG. 5, to create space for tooth 535*e*. As each of teeth 535*a*-535*d* and 535*f* are pushed by spring force applied by spring 560, teeth 535*a*-535*d* and 535*f* are guided by arch wire 555 to maintain a proper alignment.

As teeth 535*a*-535*d* and 535*f* are moved to create space for 535*e*, arch wire 555 must become longer to accommodate the increased space between teeth 535*d* and 535*e*. As shown in FIG. 5, arch wire 555 is terminated at a rear portion of extended buccal tube 505 such that arch wire 555 is virtually entirely contained within buccal tube 505. As teeth 535*a*-535*d* and 535*f* move, arch wire 555 may progressively slide through extended buccal tube such that an end of arch wire 555 may be visible through window 515*a* or 515*b*. However, arch wire 555 is maintained within extended buccal tube 505 throughout the process of moving teeth 535*a*-535*d* and 535*f* to provide space for tooth 535*e*. Since an end of arch wire 555 is contained within extended buccal tube 505 throughout the process, an end of arch wire 555 is not exposed to cause injury to a person as in conventional solutions. Further, since arch wire 555 is fully contained within extended buccal tube 505 throughout the process of moving teeth 535*a*-535*d* and 535*f*, arch wire 555 may accommodate space needed for tooth 535*e* by sliding through extended buccal tube 505. Thus, extended buccal tube 505 provides additional space for retaining arch wire 555 that may be applied to separate, for example, two teeth to accommodate another tooth. More simply put, arch wire 555 may be installed with an overall length to be drawn through extended buccal tube 505 to accommodate an increase in an overall distance around the circumference of teeth in a person's jaw without replacement of arch wire 555 and without causing injury to a wearer of braces 500.

Figure 6A:
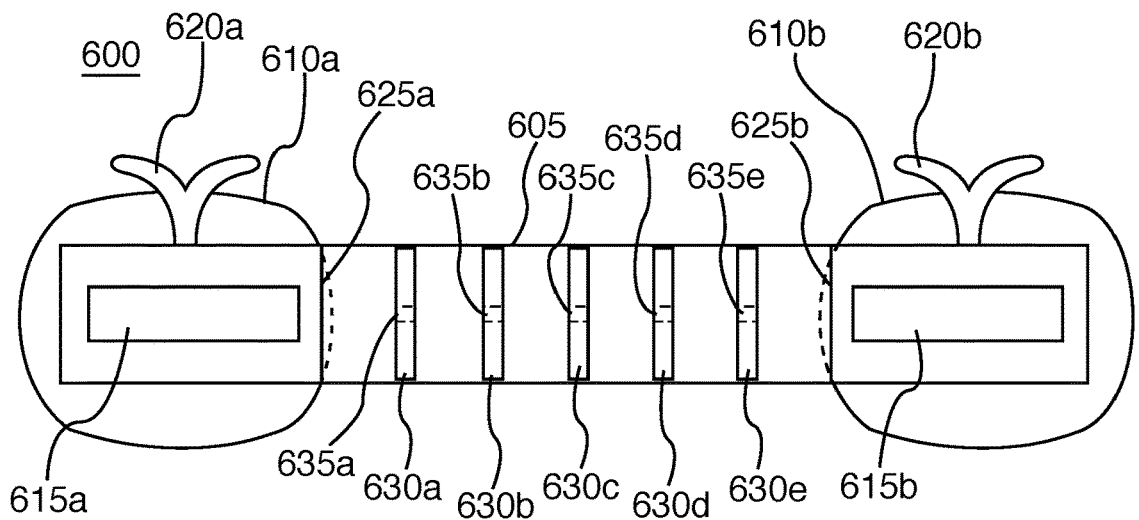
FIG. 6A illustrates a side view of an extended skeletonized buccal tube.

FIG. 6A illustrates a side view of an extended skeletonized buccal tube 600. Extended skeletonized buccal tube 600 includes a body 605 which is connected to a first pad 610*a* and a second pad 610*b* which may be installed on an inside surface of body 605 and used to affix extended skeletonized buccal tube 600 to teeth. Body 605 may further include a plurality of windows or viewing ports 615*a* and 615*b* cut into sections of body 605 which include first pad 610*a* and second pad 610*b*. Windows 615*a* and 615*b* allow an orthodontist to view an arch wire which may be disposed inside sections of body 605 which include first pad 610*a* and second pad 610*b*, as will be discussed below. Windows 615*a* and 615*b* may be installed along an outside surface of body 605, such as a surface of extended skeletonized buccal tube 600 which is a surface opposite of pad 610*a* and pad 610*b*. Alternatively, windows 615*a* and 615*b* may be provided along a bottom surface of body 605 (opposite of hook 620*a* and 620*b*) in addition to or in lieu of windows installed along an outside surface of body 605.

Further, while body 605 is shown as including two windows 615*a* and 615*c*, any number of windows may be implemented in extended skeletonized buccal tube 600. In one embodiment, body 605 may include a single window. In another embodiment, body 605 may include two windows. In another embodiment, body 605 may include a plurality of windows. The number of windows implemented in body 605 may be determined by an orthodontist's preferences or by a cost/benefit analysis of incorporating a specific number of windows into body 605 during a manufacturing process. Alternatively, the number of windows implemented in body 605 may be determined by mechanical stresses on body 605 in order to balance maximum view area inside body 605 against minimum required structural strength for body 605.

As used herein, "extended length" buccal tube 600 may be a buccal tube that is as long as a distance between midpoints of two consecutive teeth within a person's jaw (such as a second molar and a first molar, for example). In another example, an "extended length" buccal tube 600 may be a buccal tube that is as long as a horizontal length of two consecutive teeth along a person's jaw (e.g., a distance along an outer surface of a second molar and a first molar where braces are normally installed). In another example, an "extended length" buccal tube 600 may be a buccal tube that is longer than a width of a tooth along an outer surface of a person's jaw which may be about 8 millimeters. In more precise terms, an extended length buccal tube 600 may be a buccal tube that is between 8 and 25 millimeters across a length of body 605.

Body 605 may further include a hook 620a and 620b for accommodating attachments, by rubber bands, to other orthodontic devices installed with extended skeletonized buccal tube 600. Hook 620a may be attached to a top surface of body 605, proximate to a section of body 605 that includes pad 610a of extended buccal tube 600 and may rise from the top surface of body 605 in an arcuate manner, or in a curve, at a necessary length to facilitate attachment of a rubber band to hook 620a. Hook 620b may be attached to a top surface of body 605, proximate to a section of body 605 that includes pad 610b of extended buccal tube 600 and may rise from the top surface of body 605 in an arcuate manner, or in a curve, at a necessary length to facilitate attachment of a rubber band to hook 620b. Hook 620a and hook 620b may be implemented as a single hook or may be implemented as a double hook, as shown in FIG. 6A. A single hook may have an arcuate portion extending in a first direction while a double hook may include a second arcuate portion extending in another second direction, usually opposite of the first direction. For example, a double hook may be implemented in a "Y" shape having two hooks arc away from a central stem. Hook 620a and hook 620b may be used for any orthodontic purpose to attach a rubber band from hook 620a and hook 620b to another location, as determined necessary by an orthodontist. For example, in order to adjust a person's bite, rubber bands may be attached between hook 620a or hook 620b and another orthodontic device on a person's lower jaw. In some embodiments, hook 620a and hook 620b may be optionally installed, may be removed by cutting, or may not be included.

Body 605 may further include a first scoring 625a and a second scoring 625b that extends circumferentially around an axis defined by a width of body 605, as shown in FIGS. 6A-6D. First scoring 625a and second scoring 625b may be perforations or points where extended skeletonized buccal tube 600 has been scored to accommodate cutting of body 205 by various cutting devices, such as wire cutters. For example, when adequate space has been created for a stuck tooth, body 605 may be cut at first scoring 625a and second scoring 625b to remove a connection between a first tooth and a second tooth, leaving an arch wire as the only remaining connection between the first tooth and a second tooth.

Body 605 may further include one or more buccal tabs 630a-630e which extend outwardly from body 605 in a section of body 605 that is between pad 610a and pad 610b. As shown in FIG. 6A, body 605 includes 5 buccal tabs 630a-630e though this implementation is purely representative of one possible implementation and is not specifically limited to any particular number of buccal tabs. A single buccal tab, such as buccal tab 630c, may be implemented on body 605. Two buccal tabs, such as buccal tab 630b and buccal tab 630d, may be implemented on body 605. A plurality of buccal tabs, such as buccal tabs 630a-630e may be implemented on body 605.

Buccal tabs 630a-630e each include an aperture, such as apertures 635a-635e, respectively, which allow an arch wire to be disposed therethrough. Thus, in this extended skeletonized buccal tube 600 implementation, an arch wire may still be contained within each portion of extended skeletonized buccal tube 600 although the arch wire may be disposed through apertures 635a-635e in buccal tabs 630a-630e. It should also be noted that each of the one or more buccal tabs that are implemented on body 605 include an aperture 635. Accordingly, as arch wire length is consumed by opening space for a stuck tooth, the arch wire may be retained in an extended skeletonized "tube" created by apertures 635a-635e in buccal tabs 630a-630e. Apertures 635a-635e in buccal tabs 630a-630e may be aligned with a center of a tube disposed in extended skeletonized buccal tube 600.

Figure 6B:
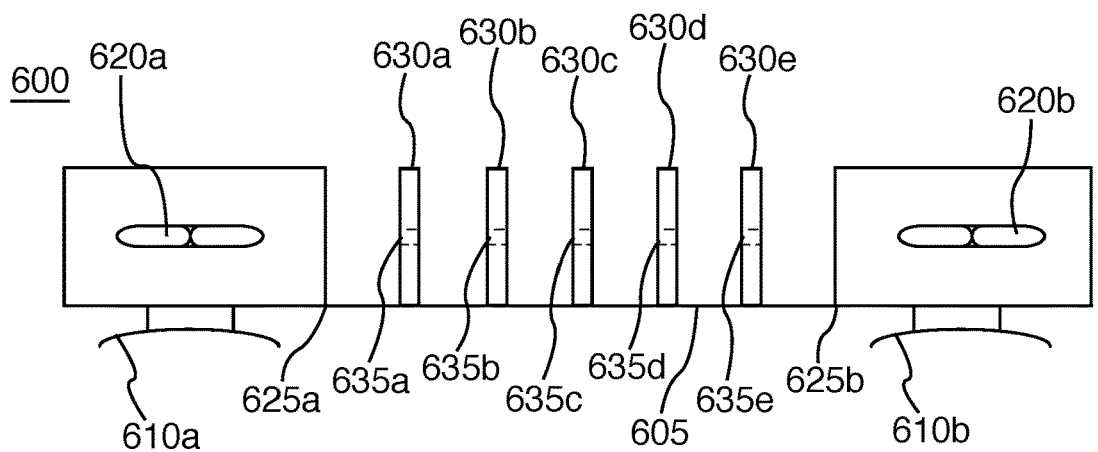
FIG. 6B illustrates a top view of an extended skeletonized buccal tube.

FIG. 6B illustrates a top view of extended skeletonized buccal tube 600. As shown in FIG. 6B, extended skeletonized buccal tube 600 includes body 605 and a first tooth pad 610a and a second tooth pad 610b. Body 605 includes scoring across the top surface of body 605, as shown in FIG. 6B, implemented as first scoring 625a and second scoring 625b, as described above. Hook 620a and hook 620b, as described above, may further be installed on body 605 of extended buccal tube 600.

Figure 6C:
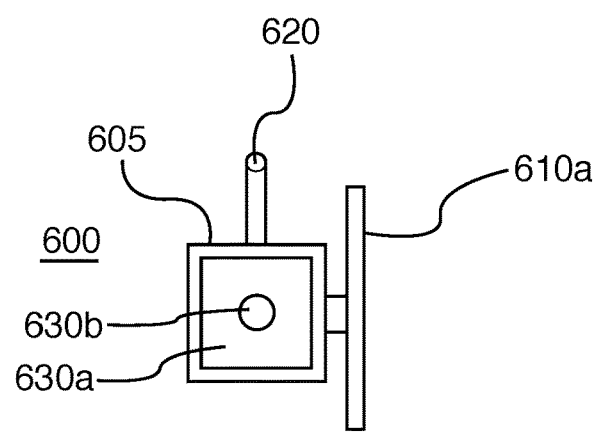
FIG. 6C illustrates an axial view of an extended skeletonized buccal tube.

As shown in FIG. 6B, buccal tabs 630a-630e may be provided with apertures 635a-635e to accommodate an arch wire disposed within extended skeletonized buccal tube 600. Thus, extended skeletonized buccal tube 600 may include a non-continuous tube that extends between various sections of body 605 via apertures 635a-635e FIG. 6C illustrates an axial view of extended skeletonized buccal tube 600. As shown in FIG. 6C, the axial view of extended buccal tube 600 is a perspective looking down tube 630a (and aperture 630b) from the rear of extended buccal tube 600. Extended buccal tube 600 includes a body 605 and a first tooth pad 610a. Second tooth pad 610b is not shown in FIG. 6C due to the axial perspective of the view shown in FIG. 6C. Hook 620 may also be provided. Body 605 may provide a tube 630a (and aperture 630b) which may accommodate an arch wire. Tube 630a may be cylindrical, square, or any other shape to accommodate an arch wire being installed within tube 630. Aperture 630b may also be cyndrical, square, or any other shape to accommodate an arch wire being installed through tube 630a and aperture 630b. Tube 630a and aperture 630b provide a continuous but interrupted recess from a first end of body 605 to a second end of body 605.

Figure 6D:
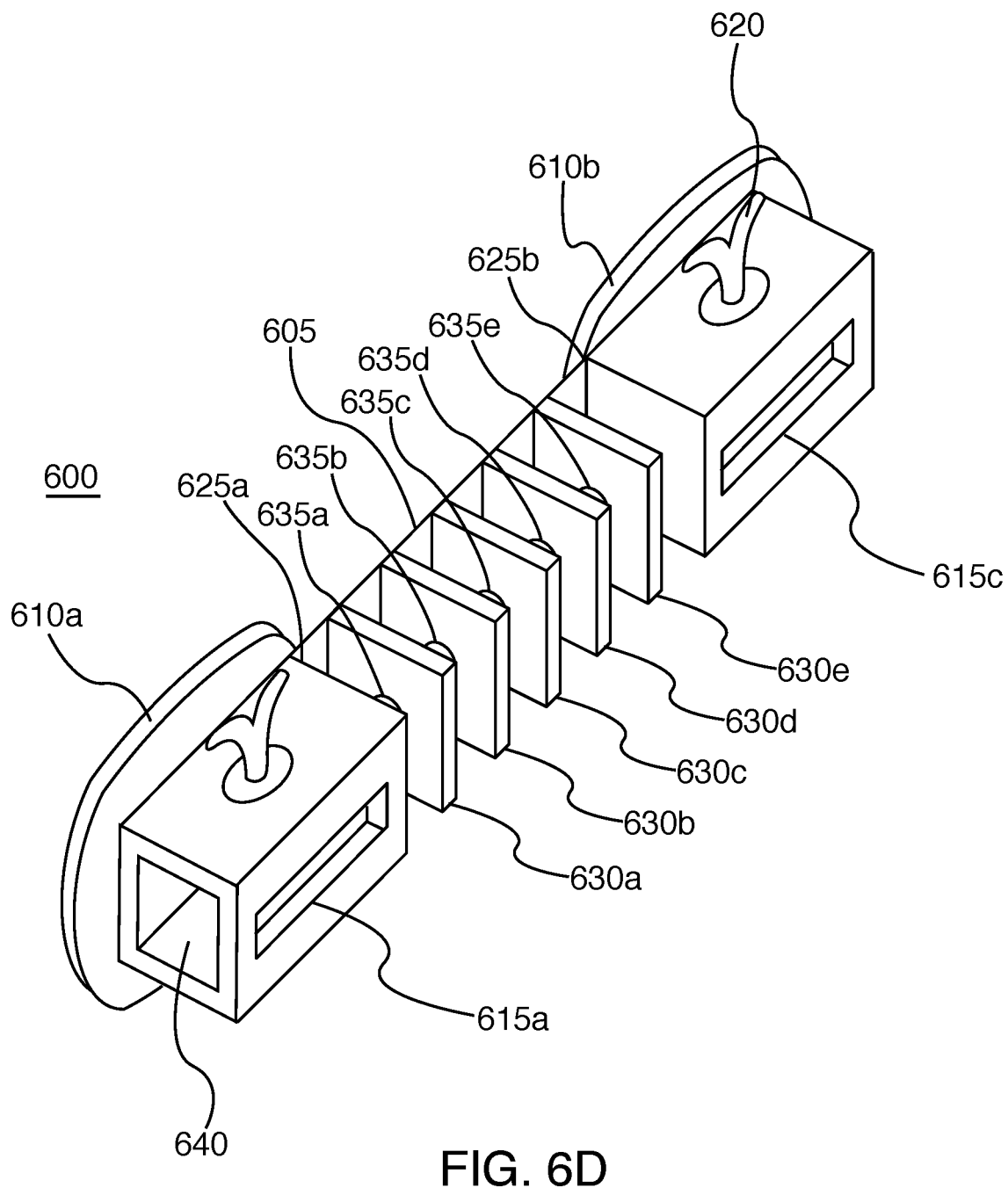
FIG. 6D illustrates a perspective view of an extended skeletonized buccal tube.

FIG. 6D illustrates a perspective view of an extended skeletonized buccal tube 600. As shown in FIG. 6D, the perspective view of extended skeletonized buccal tube 600 is a perspective looking at extended skeletonized buccal tube 600 from a top/front perspective. Extended skeletonized buccal tube 600 includes a body 605. A first tooth pad 610a and a second tooth pad 610b is attached to body 605 which allows body 605 to be connected, via first tooth pad 610a and second tooth pad 610b to two teeth. As previously discussed, windows 615a and 615b, may be installed in a side of body 605 to allow an orthodontist to see inside tube 230 in those portions of body 605. Body 605 may further include one or more buccal tabs 630a-630e which each include apertures 635a-635e, respectively to accommodate an arch wire. Tube 630 may be an interrupted albeit continuous recess through body 605 such that a continuous recess 640 is formed between a first end and a second end of body 605. Hook 620a and hook 620b may be disposed on a top surface of body 605, as previously discussed. Body 605 of extended buccal tube 600 may further include first scoring 625a and second scoring 625b, which have been discussed previously.

Figure 7A:
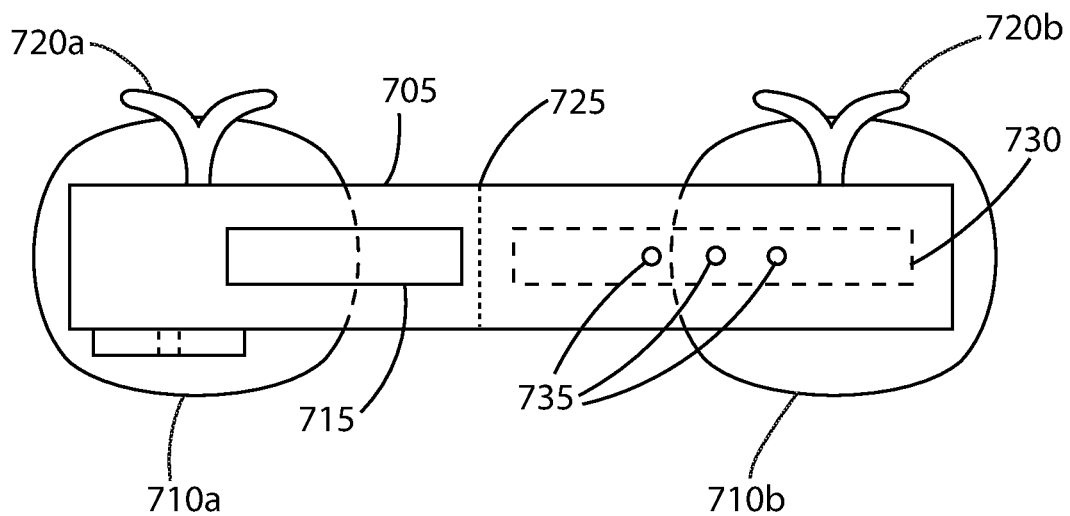
FIG. 7A illustrates a side view of an extended buccal tube with an adjustable slide.

FIG. 7A illustrates a side view of an extended buccal tube with an adjustable slide. Extended buccal tube 700 includes a body 705 which is connected to a first pad 710a and a second pad 710b which may be installed on an inside surface of body 705 and used to affix extended buccal tube 700 to teeth. Body 705 may further include a plurality of windows or viewing ports 715 cut into sections of body 705. Window 715 allows an orthodontist to view an arch wire which may be disposed inside sections of body 705. Window 715 may be installed along an outside surface of body 705, such as a surface of extended buccal tube 700 which is a surface opposite of pad 710a and pad 710b. Alternatively, window 715 may be provided along a bottom surface of body 705 (opposite of hook 720a and 720b) in addition to or in lieu of windows installed along an outside surface of body 705.

Further, while body 705 is shown as including window 715, any number of windows may be implemented in extended buccal tube 700. In another embodiment, body 705 may include two windows. In another embodiment, body 705 may include a plurality of windows. The number of windows implemented in body 705 may be determined by an orthodontist's preferences or by a cost/benefit analysis of incorporating a specific number of windows into body 705 during a manufacturing process. Alternatively, the number of windows implemented in body 705 may be determined by mechanical stresses on body 705 in order to balance maximum view area inside body 705 against minimum required structural strength for body 705.

An extended length buccal tube 700 may be a buccal tube that is as long as a distance between midpoints of two consecutive teeth within a person's jaw (such as a second molar and a first molar, for example). In another example, an "extended length" buccal tube 700 may be a buccal tube that is as long as a horizontal length of two consecutive teeth along a person's jaw (e.g., a distance along an outer surface of a second molar and a first molar where braces are normally installed). In another example, an "extended length" buccal tube 700 may be a buccal tube that is longer than a width of a tooth along an outer surface of a person's jaw which may be about 8 millimeters. In more precise terms, an extended length buccal tube 700 may be a buccal tube that is between 8 and 25 millimeters across a length of body 705.

Body 705 may further include a hook 720a and 720b for accommodating attachments, by rubber bands, to other orthodontic devices installed with extended buccal tube 700. Hook 720a may be attached to a top surface of body 705, proximate to a section of body 705 that includes pad 710a of extended buccal tube 700 and may rise from the top surface of body 705 in an arcuate manner, or in a curve, at a necessary length to facilitate attachment of a rubber band to hook 720a. Hook 720b may be attached to a top surface of body 705, proximate to a section of body 705 that includes pad 710b of buccal tube 700 and may rise from the top surface of body 705 in an arcuate manner, or in a curve, at a necessary length to facilitate attachment of a rubber band to hook 720b. Hook 720a and hook 720b may be implemented as a single hook or may be implemented as a double hook, as shown in FIG. 7A. A single hook may have an arcuate portion extending in a first direction while a double hook may include a second arcuate portion extending in another second direction, usually opposite of the first direction. For example, a double hook may be implemented in a "Y" shape having two hooks arc away from a central stem. Hook 720a and hook 720b may be used for any orthodontic purpose to attach a rubber band from hook 720a and hook 720b to another location, as determined necessary by an orthodontist. For example, in order to adjust a person's bite, rubber bands may be attached between hook 720a or hook 720b and another orthodontic device on a person's lower jaw. In some embodiments, hook 720a and hook 720b may be optionally installed, may be removed by cutting, or may not be included.

Body 705 may further include scoring 725 that extends circumferentially around an axis defined by a width of body 705, as shown in FIGS. 7A-7D. Scoring 725 may be perforations or points where extended buccal tube 700 has been scored to accommodate cutting of body 705 by various cutting devices, such as wire cutters. For example, when adequate space has been created for a stuck tooth, body 705 may be cut at scoring 725 to remove a connection between a first tooth and a second tooth, leaving an arch wire as the only remaining connection between the first tooth and a second tooth.

Body 705 may further include adjustable slide 730. Adjustable slide 730 is attached to tooth pad 710b and allows movement between adjustable slide 730 and body 705. Body 705 further includes stopper pins 735 that connect to adjustable slide 730 and body 705 through apertures in both body 705 and adjustable slide 730. Stopper pins 735 restrict the movement between body 705 and adjustable slide 730. Where stopper pins 735 are placed is determined by an orthodontist's preference and stopper pins 735 may be adjusted as teeth move during the orthodontic process. Any number of pins may be implemented in buccal tube 700. In one embodiment, body 705 may include a single stopper pin 735. In another embodiment, body 705 may include two stopper pins 735. In another embodiment, as illustrated in FIG. 7A, body 705 may include a plurality of stopper pins 735. The number of stopper pins 735 implemented in body 705 may be determined by an orthodontist's preferences or by a cost/benefit analysis of incorporating a specific number of stopper pins 735 into body 705 during a manufacturing process. Alternatively, the number of stopper pins 735 implemented in body 705 may be determined by mechanical stresses on body 705 in order to balance maximum need for stopper pins 735 inside body 705 against minimum required structural strength for body 705.

Figure 7B:
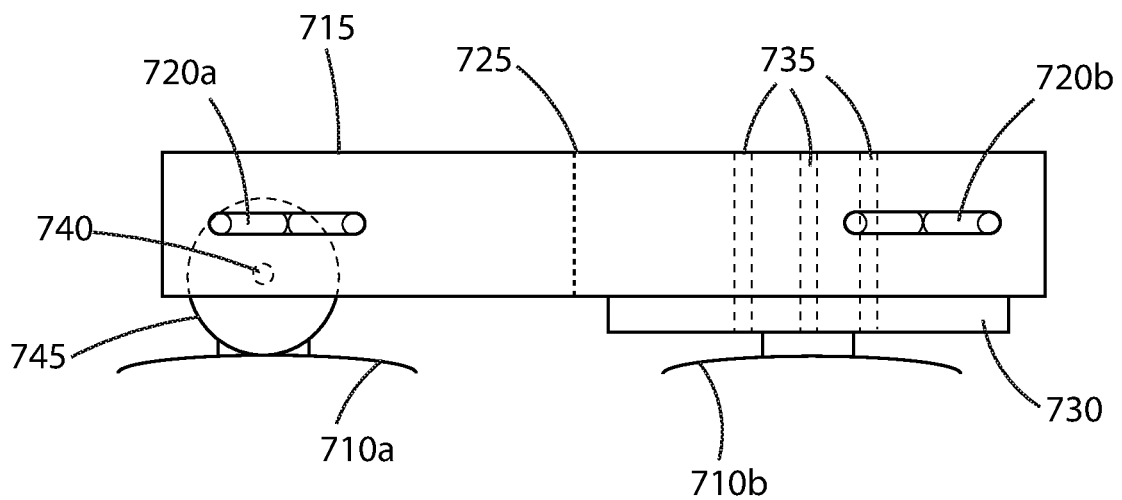
FIG. 7B illustrates a top view of an extended buccal tube with a swivel and an adjustable slide.

FIG. 7B illustrates a top view of an extended buccal tube with a swivel and an adjustable slide. Extended buccal tube 700 is connected to a first pad 710a and a second pad 710b which may be used to affix extended buccal tube 700 to teeth. Window 715 allows an orthodontist to view an arch wire which may be disposed inside sections of extended buccal tube 700 which include first pad 710a and second pad 710b. Window 715 may be installed along an outside surface of body 705, such as a surface of extended buccal tube 700 which is a surface opposite of pad 710a and pad 710b. Alternatively, window 715 may be provided along a bottom surface of body 705 (opposite of hook 720a and 720b) in addition to or in lieu of windows installed along an outside surface of body 705.

Further, extended buccal tube 700 may include a window 715, any number of windows may be implemented in extended buccal tube 700. In another embodiment, extended buccal tube 700 may include two windows. In another embodiment, extended buccal tube 700 may include a plurality of windows. The number of windows implemented in extended buccal tube 700 may be determined by an orthodontist's preferences or by a cost/benefit analysis of incorporating a specific number of windows into extended buccal tube 700 during a manufacturing process. Alternatively, the number of windows implemented in extended buccal tube 700 may be determined by mechanical stresses on extended buccal tube 700 in order to balance maximum view area inside body 700 against minimum required structural strength for extended buccal tube 700.

Extended buccal tube 700 may further include a hook 720a and 720b for accommodating attachments, by rubber bands, to other orthodontic devices installed with extended buccal tube 700. Hook 720a may be attached to a top surface of extended buccal tube 700, proximate to a section of extended buccal tube 700 that includes pad 710a of extended buccal tube 700 and may rise from the top surface of extended buccal tube 700 in an arcuate manner, or in a curve, at a necessary length to facilitate attachment of a rubber band to hook 720a. Hook 720b may be attached to a top surface of extended buccal tube 700, proximate to a section of extended buccal tube 700 that includes pad 710b of extended buccal tube 700 and may rise from the top surface of extended buccal tube 700 in an arcuate manner, or in a curve, at a necessary length to facilitate attachment of a rubber band to hook 720b. Hook 720a and hook 720b may be implemented as a single hook or may be implemented as a double hook, as shown in FIG. 7B. A single hook may have an arcuate portion extending in a first direction while a double hook may include a second arcuate portion extending in another second direction, usually opposite of the first direction. For example, a double hook may be implemented in a "Y" shape having two hooks arc away from a central stem. Hook 720a and hook 720b may be used for any orthodontic purpose to attach a rubber band from hook 720a and hook 720b to another location, as determined necessary by an orthodontist. For example, in order to adjust a person's bite, rubber bands may be attached between hook 720a or hook 720b and another orthodontic device on a person's lower jaw. In some embodiments, hook 720a and hook 720b may be optionally installed, may be removed by cutting, or may not be included.

Extended buccal tube 700 may further include scoring 725 that extends circumferentially around an axis defined by a width of extended buccal tube 700, as shown in FIGS. 7A-7D. Scoring 725 may be perforations or points where extended buccal tube 700 has been scored to accommodate cutting of extended buccal tube 700 by various cutting devices, such as wire cutters. For example, when adequate space has been created for a stuck tooth, extended buccal tube 700 may be cut at scoring 725 to remove a connection between a first tooth and a second tooth, leaving an arch wire as the only remaining connection between the first tooth and a second tooth.

Extended buccal tube 700 may further include adjustable slide 730. Adjustable slide 730 is attached to tooth pad 710b and allows movement between adjustable slide 730 and extended buccal tube 700. Extended buccal tube 700 further includes stopper pins 735 that connect to adjustable slide 730 and extended buccal tube 700 through apertures in both extended buccal tube 700 and adjustable slide 730. Stopper pins 735 restrict the movement between extended buccal tube 700 and adjustable slide 730. Where stopper pins 735 are placed is determined by an orthodontist's preference. Furthermore, stopper pins 735 may be adjusted as teeth move during the orthodontic process. Any number of pins may be implemented in buccal tube 700. In one extended buccal tube 700 may include a single stopper pin 735. In another embodiment, extended buccal tube 700 may include two stopper pins 735. In another embodiment, as illustrated in FIG. 7A, extended buccal tube 700 may include a plurality of stopper pins 735. The number of stopper pins 735 implemented in extended buccal tube 700 may be determined by an orthodontist's preferences or by a cost/benefit analysis of incorporating a specific number of stopper pins 735 into extended buccal tube 700 during a manufacturing process. Alternatively, the number of stopper pins 735 implemented in extended buccal tube 700 may be determined by mechanical stresses on extended buccal tube 700 in order to balance maximum need for stopper pins 735 inside extended buccal tube 700 against minimum required structural strength for extended buccal tube 700.

Extended buccal tube 700 further contains swivel pivot point 740 and swivel 745. Swivel pivot point 740 is connected to extended buccal tube 700 and to Swivel 745. Swivel 745 further connects to pad 710a and pad 710a and swivel pivot point 740. Swivel pivot point 740 may be connect to swivel 745 by a pivot joint allowing the allows extended buccal tube 700 to articulate. Swivel pivot point 740 may be connected to swivel 745 in various manners including but not limited to ball and socket joint, hinge joint, saddle joint, universal joint and other joints known to those skilled in the art.

Figure 7C:
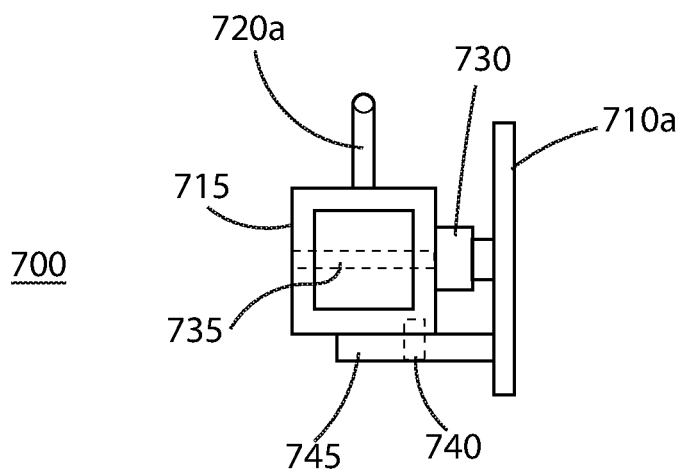
FIG. 7C illustrates a cross-section view of an extended buccal tube with a swivel and an adjustable slide.

FIG. 7C illustrates a cross-section view of an extended buccal tube with a swivel and an adjustable slide. Extended buccal tube 700 is connected to a first pad 710 a and may include a second pad as shown in FIG. 7B which may be used to affix extended buccal tube 700 to teeth. Window 715 allows an orthodontist to view an arch wire which may be disposed inside sections of extended buccal tube 700 which include first pad 710a and second pad 710b. Window 715 may be installed along an outside surface of body 705, such as a surface of extended buccal tube 700 which is a surface opposite of pad 710a and pad 710b. Alternatively, window 715 may be provided along a bottom surface of body 705 (opposite of hook 720a and 720b) in addition to or in lieu of windows installed along an outside surface of buccal tube 700.

Further, extended buccal tube 700 may include a window 715, any number of windows may be implemented in extended buccal tube 700. In another embodiment, extended buccal tube 700 may include two windows. In another embodiment, extended buccal tube 700 may include a plurality of windows. The number of windows implemented in extended buccal tube 700 may be determined by an orthodontist's preferences or by a cost/benefit analysis of incorporating a specific number of windows into extended buccal tube 700 during a manufacturing process. Alternatively, the number of windows implemented in extended buccal tube 700 may be determined by mechanical stresses on extended buccal tube 700 in order to balance maximum view area inside body 700 against minimum required structural strength for extended buccal tube 700.

Extended buccal tube 700 may further include a hook 720a and may include 720b as shown in FIG. 7B for accommodating attachments, by rubber bands, to other orthodontic devices installed with extended buccal tube 700. Hook 720a may be attached to a top surface of extended buccal tube 700, proximate to a section of extended buccal tube 700 that includes pad 710a of extended buccal tube 700 and may rise from the top surface of extended buccal tube 700 in an arcuate manner, or in a curve, at a necessary length to facilitate attachment of a rubber band to hook 720a. Hook 720b may be attached to a top surface of extended buccal tube 700, proximate to a section of extended buccal tube 700 that includes pad 710b of extended buccal tube 700 and may rise from the top surface of extended buccal tube 700 in an arcuate manner, or in a curve, at a necessary length to facilitate attachment of a rubber band to hook 720b. Hook 720a and hook 720b may be implemented as a single hook or may be implemented as a double hook, as shown in FIG. 7B. A single hook may have an arcuate portion extending in a first direction while a double hook may include a second arcuate portion extending in another second direction, usually opposite of the first direction. For example, a double hook may be implemented in a "Y" shape having two hooks arc away from a central stem. Hook 720a and hook 720b may be used for any orthodontic purpose to attach a rubber band from hook 720a and hook 720b to another location, as determined necessary by an orthodontist. For example, in order to adjust a person's bite, rubber bands may be attached between hook 720a or hook 720b and another orthodontic device on a person's lower jaw. In some embodiments, hook 720a and hook 720b may be optionally installed, may be removed by cutting, or may not be included.

Extended buccal tube 700 may further include scoring 725 that extends circumferentially around an axis defined by a width of extended buccal tube 700, as shown in FIGS. 7A-7D. Scoring 725 may be perforations or points where extended buccal tube 700 has been scored to accommodate cutting of extended buccal tube 700 by various cutting devices, such as wire cutters. For example, when adequate space has been created for a stuck tooth, extended buccal tube 700 may be cut at scoring 725 to remove a connection between a first tooth and a second tooth, leaving an arch wire as the only remaining connection between the first tooth and a second tooth.

Extended buccal tube 700 may further include adjustable slide 730. Adjustable slide 730 is attached to tooth pad 710b and allows movement between adjustable slide 730 and extended buccal tube 700. Extended buccal tube 700 further includes stopper pins 735 that connect to adjustable slide 730 and extended buccal tube 700 through apertures in both extended buccal tube 700 and adjustable slide 730. Stopper pins 735 restrict the movement between extended buccal tube 700 and adjustable slide 730. Where stopper pins 735 are placed is determined by an orthodontist's preference. Moreover, stopper pins 735 may be adjusted as teeth move during the orthodontic process. Any number of pins may be implemented in buccal tube 700. In one extended buccal tube 700 may include a single stopper pin 735. In another embodiment, extended buccal tube 700 may include two stopper pins 735. In another embodiment, as illustrated in FIG. 7A, extended buccal tube 700 may include a plurality of stopper pins 735. The number of stopper pins 735 implemented in extended buccal tube 700 may be determined by an orthodontist's preferences or by a cost/benefit analysis of incorporating a specific number of stopper pins 735 into extended buccal tube 700 during a manufacturing process. Alternatively, the number of stopper pins 735 implemented in extended buccal tube 700 may be determined by mechanical stresses on extended buccal tube 700 in order to balance maximum need for stopper pins 735 inside extended buccal tube 700 against minimum required structural strength for extended buccal tube 700.

Extended buccal tube 700 further contains swivel pivot point 740 and swivel 745. Swivel pivot point 740 is connected to extended buccal tube 700 and swivel 745 and swivel 745 further connects to pad 710a. Swivel pivot point 740 may be connect to swivel 745 by a pivot joint allowing the allows extended buccal tube 700 to rotate. Swivel pivot point 740 may be connected to swivel 745 in various manners including but not limited to ball and socket joint, hinge joint, saddle joint, universal joint and other joints known to those skilled in the art.

Figure 7D:
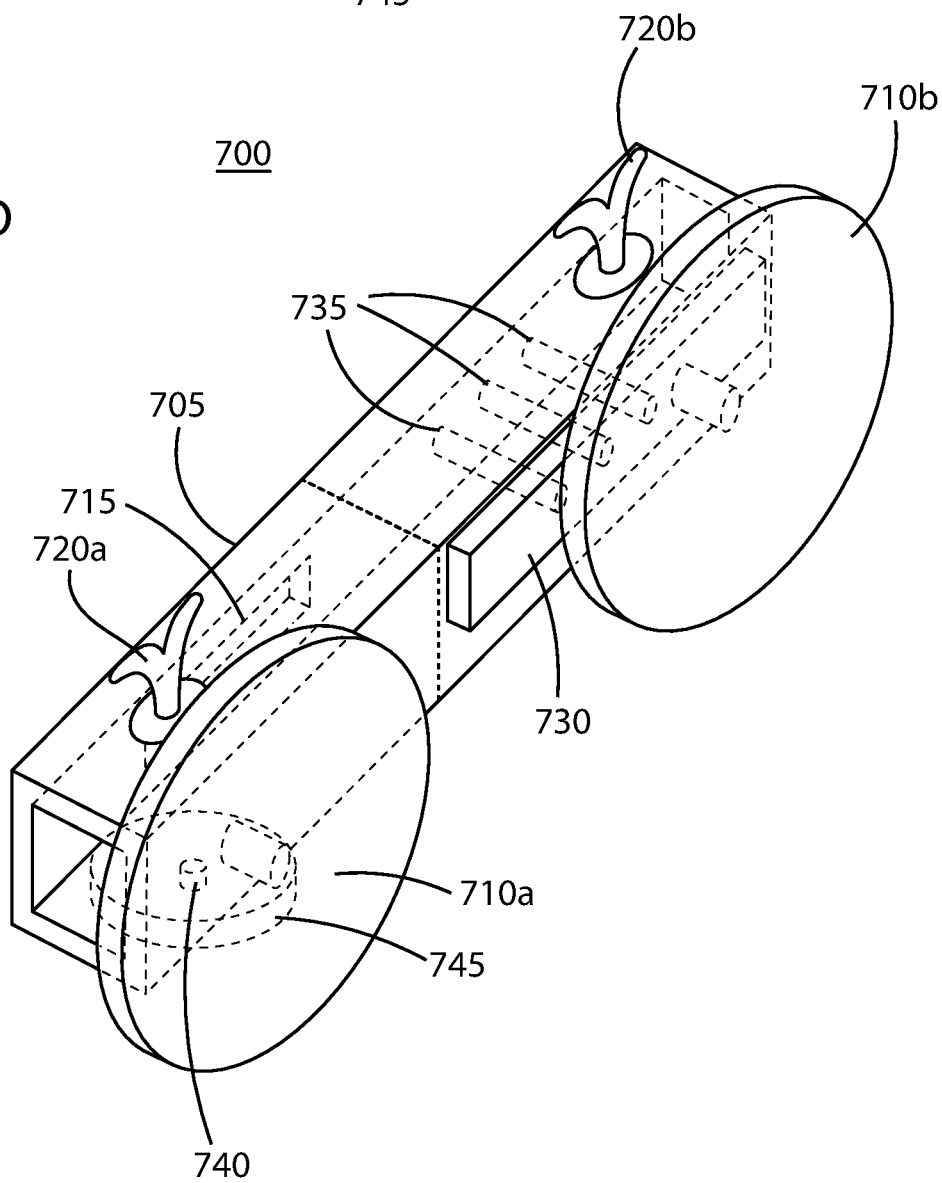
FIG. 7D illustrates a perspective view of an extended buccal tube with a swivel and an adjustable slide.

FIG. 7D illustrates a perspective view of an extended buccal tube with a swivel and an adjustable slide. Extended buccal tube 700 includes a body 705 which is connected to a first pad 710a and a second pad 710b which may be installed on an inside surface of body 705 and used to affix extended buccal tube 700 to teeth. Body 705 may further include a plurality of windows or viewing ports 715 cut into sections of body 705 which include first pad 710a and second pad 710b. Window 715 allows an orthodontist to view an arch wire which may be disposed inside sections of body 705 which include first pad 710a and second pad 710b, as will be discussed below. Window 715 may be installed along an outside surface of body 705, such as a surface of extended buccal tube 700 which is a surface opposite of pad 710a and pad 710b. Alternatively, window 715 may be provided along a bottom surface of body 705 (opposite of hook 720a and 720b) in addition to or in lieu of windows installed along an outside surface of body 705.

Further, while body 705 is shown as including window 715, any number of windows may be implemented in extended buccal tube 700. In another embodiment, body 705 may include two windows. In another embodiment, body 705 may include a plurality of windows. The number of windows implemented in body 705 may be determined by an orthodontist's preferences or by a cost/benefit analysis of incorporating a specific number of windows into body 705 during a manufacturing process. Alternatively, the number of windows implemented in body 705 may be determined by mechanical stresses on body 705 in order to balance maximum view area inside body 705 against minimum required structural strength for body 705.

An extended length buccal tube 700 may be a buccal tube that is as long as a distance between midpoints of two consecutive teeth within a person's jaw (such as a second molar and a first molar, for example). In another example, an "extended length" buccal tube 700 may be a buccal tube that is as long as a horizontal length of two consecutive teeth along a person's jaw (e.g., a distance along an outer surface of a second molar and a first molar where braces are normally installed). In another example, an "extended length" buccal tube 700 may be a buccal tube that is longer than a width of a tooth along an outer surface of a person's jaw which may be about 8 millimeters. In more precise terms, an extended length buccal tube 700 may be a buccal tube that is between 8 and 25 millimeters across a length of body 705.

Body 705 may further include a hook 720a and 720b for accommodating attachments, by rubber bands, to other orthodontic devices installed with extended buccal tube 700. Hook 720a may be attached to a top surface of body 705, proximate to a section of body 705 that includes pad 710a of extended buccal tube 700 and may rise from the top surface of body 705 in an arcuate manner, or in a curve, at a necessary length to facilitate attachment of a rubber band to hook 720a. Hook 720b may be attached to a top surface of body 705, proximate to a section of body 705 that includes pad 710b of buccal tube 700 and may rise from the top surface of body 705 in an arcuate manner, or in a curve, at a necessary length to facilitate attachment of a rubber band to hook 720b. Hook 720a and hook 720b may be implemented as a single hook or may be implemented as a double hook, as shown in FIG. 7A. A single hook may have an arcuate portion extending in a first direction while a double hook may include a second arcuate portion extending in another second direction, usually opposite of the first direction. For example, a double hook may be implemented in a "Y" shape having two hooks arc away from a central stem. Hook 720a and hook 720b may be used for any orthodontic purpose to attach a rubber band from hook 720a and hook 720b to another location, as determined necessary by an orthodontist. For example, in order to adjust a person's bite, rubber bands may be attached between hook 720a or hook 720b and another orthodontic device on a person's lower jaw. In some embodiments, hook 720a and hook 720b may be optionally installed, may be removed by cutting, or may not be included.

Body 705 may further include scoring 725 that extends circumferentially around an axis defined by a width of body 705, as shown in FIGS. 7A-7D. Scoring 725 may be perforations or points where extended buccal tube 700 has been scored to accommodate cutting of body 705 by various cutting devices, such as wire cutters. For example, when adequate space has been created for a stuck tooth, body 705 may be cut at scoring 725 to remove a connection between a first tooth and a second tooth, leaving an arch wire as the only remaining connection between the first tooth and a second tooth.

Body 705 may further include adjustable slide 730. Adjustable slide 730 is attached to tooth pad 710b and allows movement between adjustable slide 730 and body 705. Body 705 further includes stopper pins 735 that connect to adjustable slide 730 and body 705 through apertures in both body 705 and adjustable slide 730. Stopper pins 735 restrict the movement between body 705 and adjustable slide 730. Any number of pins may be implemented in buccal tube 700. In one embodiment, body 705 may include a single stopper pin 735. In another embodiment, body 705 may include two stopper pins 735. In another embodiment, as illustrated in FIG. 7A, body 705 may include a plurality of stopper pins 735. The number of stopper pins 735 implemented in body 705 may be determined by an orthodontist's preferences or by a cost/benefit analysis of incorporating a specific number of stopper pins 735 into body 705 during a manufacturing process. Alternatively, the number of stopper pins 735 implemented in body 705 may be determined by mechanical stresses on body 705 in order to balance maximum need for stopper pins 735 inside body 705 against minimum required structural strength for body 705.

Extended buccal tube 700 further contains swivel pivot point 740 and swivel 745. Swivel pivot point 740 is connected to extended buccal tube 700 and to Swivel 745. Swivel 745 further connects to pad 710a and pad 710a and swivel pivot point 740. Swivel pivot point 740 may be connect to swivel 745 by a pivot joint allowing the allows extended buccal tube 700 to articulate. Swivel pivot point 740 may be connected to swivel 745 in various manners including but not limited to ball and socket joint, hinge joint, saddle joint, universal joint and other joints known to those skilled in the art.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A buccal tube, comprising:
a tube having a first tooth pad and a second tooth pad, the tube connecting the first tooth pad and the second tooth pad, the tube further including a window disposed only either on a surface that is opposite the first tooth pad and the second tooth pad or a surface that is on a bottom side of the tube, and wherein the first tooth pad and the second tooth pad are disposed to be connected to an outer facing surface of teeth, wherein one or more tooth pads are adjustable by an adjustable slide connected to the first tooth pad, wherein the adjustable slide and the tube each include a corresponding aperture which interacts with a stopper pin.

2. The buccal tube of claim 1, wherein the buccal tube includes one or more windows disposed in the buccal tube.

3. The buccal tube of claim 1, wherein at least one of the first tooth pad and the second tooth pad are rotatable in two axes by up to 20°.

4. The buccal tube of claim 1, wherein the first tooth pad and the second tooth pad are separated from each other by approximately a length of a tooth.

5. The buccal tube of claim 4, wherein the first tooth pad is connectable to a first tooth and the second tooth pad is connectable to a second tooth where the first tooth and the second tooth are ordered consecutively within a jaw of a person.

6. The buccal tube of claim 1, wherein the buccal tube includes one or more hooks.

7. The buccal tube of claim 1, wherein an inside portion of the buccal tube is large enough to accommodate an arch wire.

8. The buccal tube of claim 1, wherein at least a portion of the tube comprises one or more separate buccal tabs each including an aperture.

9. The buccal tube of claim 1, wherein the tube is scored.

10. The buccal tube of claim 1, wherein the tube includes a plurality of holes which each accept a stopper pin.

11. A buccal tube, comprising:
a tube having a length of at least 8 millimeters;
one or more tooth pads; and
one or more windows;
wherein the window is disposed on the tube on only either a surface that is opposite the one or more tooth pad or a surface that is on a bottom side of the tube,
wherein the one or more tooth pads are disposed to be connected to an outer facing surface of teeth, and
wherein the one or more tooth pads are adjustable by an adjustable slide connected to the first tooth pad, wherein the adjustable slide and the tube each include a corresponding aperture which interacts with a stopper pin.

12. The buccal tube of claim 11, wherein the one or more windows are disposed on a side of the tube opposite the one or more tooth pads.

13. The buccal tube of claim 11, wherein an internal portion of a tube is large enough to accept an arch wire.

14. The buccal tube of claim 11, further comprising a hook.

15. The buccal tube of claim 14, wherein the hook is disposed on a surface of the tube that is 90 degrees from a surface to which the one or more tooth pads are connected.

16. The buccal tube of claim 11, wherein the one or more tooth pads are rotatable.

17. The buccal tube of claim 11, wherein the tube comprises one or more separate buccal tabs each including an aperture.

\* \* \* \* \*